US010586014B1

(12) United States Patent
Kinderman et al.

(10) Patent No.: US 10,586,014 B1
(45) Date of Patent: Mar. 10, 2020

(54) METHOD AND SYSTEM FOR VERIFICATION USING COMBINED VERIFICATION DATA

(71) Applicant: Cadence Design Systems, Inc., San Jose, CA (US)

(72) Inventors: Yael Kinderman, Givat Shmuel (IL); David Spatafore, Maple Grove, MN (US); Nili Segal, Nirit (IL); Yan Yagudayev, Beit Hashmonay (IL); Vincent Reynolds, Maidenhead Berkshire (GB)

(73) Assignee: Cadence Design Systems, Inc., San Jose, CA (US)

( * ) Notice: Subject to any disclaimer, the term of this patent is extended or adjusted under 35 U.S.C. 154(b) by 142 days.

(21) Appl. No.: 15/915,365

(22) Filed: Mar. 8, 2018

(51) Int. Cl.
*G06F 17/50* (2006.01)

(52) U.S. Cl.
CPC ........ *G06F 17/5081* (2013.01); *G06F 17/504* (2013.01); *G06F 17/5022* (2013.01); *G06F 17/5068* (2013.01); *G06F 2217/02* (2013.01); *G06F 2217/06* (2013.01)

(58) Field of Classification Search
None
See application file for complete search history.

(56) References Cited

U.S. PATENT DOCUMENTS

| | | | |
|---|---|---|---|
| 7,281,185 B2 * | 10/2007 | Maoz | G01R 31/31707 714/738 |
| 7,917,873 B1 * | 3/2011 | Canfield | G01R 31/318314 716/103 |
| 8,413,088 B1 | 4/2013 | Armbruster et al. | |
| 8,756,460 B2 * | 6/2014 | Blue | G06F 11/3676 714/38.1 |
| 8,943,450 B1 * | 1/2015 | Hartong | G06F 17/5063 716/106 |
| 9,348,733 B1 * | 5/2016 | Leibovich | G06F 11/3676 |
| 9,495,489 B2 * | 11/2016 | Carlin | G06F 17/5009 |
| 9,582,620 B1 * | 2/2017 | Segal | G06F 17/5022 |
| 10,133,803 B2 * | 11/2018 | May | G06F 16/258 |

* cited by examiner

*Primary Examiner* — Leigh M Garbowski
(74) *Attorney, Agent, or Firm* — Pearl Cohen Zedek Latzer Baratz LLP (57) ABSTRACT

A method for combining verification data may include using a processor, obtaining verification data and a verification model from each of a plurality of verification engines relating to different verification methods, the verification data relating to a plurality of verification tests that were conducted on a design under test (DUT) using the plurality of verification engines; using a processor, merging the verification models obtained from the plurality of verification engines into a merged verification model; using a processor, calculating a combined verification metric grade for a plurality of verification entities in the merged verification model using verification metric grades for each of the plurality of verification entities calculated from the verification data obtained from the plurality of engines and applying a combined verification metric grade rule; and outputting the combined verification metric grade via an output device.

16 Claims, 7 Drawing Sheets

| 400→ 404→ | Average grade | | | Status grade | | | ←406 |
|---|---|---|---|---|---|---|---|
| Assertions Name | combined Assertion Comb. Avg. Grade | sim Assertion Avg. Grade | formal Assertion Formal Avg. Grade | combined Combined Status Grade | sim Assertion Status Grade | formal Assertion Formal Status Grade | Enclosing Entity |
| cov_synched_rd_pulse | 100% | 100% | 100% | N/A | N/A | N/A | top_tgen_pvmem.u_tgen_dut.u-chk_tgen |
| cov_tgen_busy_pulse | 100% | 100% | 100% | N/A | N/A | N/A | top_tgen_pvmem.u_tgen_dut.u-chk_tgen |
| cov_PREADY_pulse | 100% | 100% | 100% | N/A | N/A | N/A | top_tgen_pvmem.u_tgen_dut.u-chk_tgen |
| a_rd_data_cfg_reload_value_dup | 100% | 0% | 100% | 100% | 0% | 100% | top_tgen_pvmem.u_tgen_dut.u-chk_tgen |
| a_rd_data_cfg_reload_value | 100% | 0% | 100% | 100% | 0% | 100% | top_tgen_pvmem.u_tgen_dut.u-chk_tgen |
| a_wr_data_cfg_reload_value_dup | 100% | 0% | 100% | 100% | 0% | 100% | top_tgen_pvmem.u_tgen_dut.u-chk_tgen |
| a_wr_data_cfg_reload_value | 100% | 0% | 100% | 100% | 0% | 100% | top_tgen_pvmem.u_tgen_dut.u-chk_tgen |
| a_id_mismatch_err_set_whithin_window | 100% | 0% | 100% | 0% | 0% | 0% | top_tgen_pvmem.u_tgen_dut.u-chk_tgen |
| a_data_error_set_within_window | 100% | 0% | 100% | 0% | 0% | 0% | top_tgen_pvmem.u_tgen_dut.u-chk_tgen |
| a_pulse_wid_chk_wr_data_fifo | 100% | 100% | 100% | 0% | 100% | 0% | top_tgen_pvmem.u_tgen_dut.u-chk_tgen |
| a_pulse_wid_chk_wr_addr_fifo | 100% | 100% | 100% | 0% | 100% | 0% | top_tgen_pvmem.u_tgen_dut.u-chk_tgen |
| a_pulse_wid_chk_rd_data_fifo | 100% | 100% | 100% | 0% | 100% | 0% | top_tgen_pvmem.u_tgen_dut.u-chk_tgen |
| a_pulse_wid_chk_rd_addr_fifo | 100% | 100% | 100% | 0% | 100% | 0% | top_tgen_pvmem.u_tgen_dut.u-chk_tgen |
| a_one_clk_pulse_load_split_wr | 100% | 0% | 100% | 0% | 0% | 0% | top_tgen_pvmem.u_tgen_dut.u-chk_tgen |
| a_one_clk_pulse_load_split_rd | 100% | 0% | 100% | 0% | 0% | 0% | top_tgen_pvmem.u_tgen_dut.u-chk_tgen |
| a_one_clk_pulse_synched_apb_wr | 100% | 100% | 100% | 0% | 100% | 0% | top_tgen_pvmem.u_tgen_dut.u-chk_tgen |
| a_one_clk_pulse_synched_apb_rd | 100% | 100% | 100% | 0% | 100% | 0% | top_tgen_pvmem.u_tgen_dut.u-chk_tgen |
| a_mutex_synched_apb_wr_rd | 100% | 100% | 0% | 100% | 100% | 0% | top_tgen_pvmem.u_tgen_dut.u-chk_tgen |
| a_tgen_busy_pulse_width | 100% | 100% | 100% | 0% | 100% | 0% | top_tgen_pvmem.u_tgen_dut.u-chk_tgen |
| a_one_clk_pulse_PREADY | 100% | 100% | 100% | 0% | 100% | 0% | top_tgen_pvmem.u_tgen_dut.u-chk_tgen |
| a_one_clk_later | 100% | 100% | 100% | 0% | 100% | 0% | top_tgen_pvmem.u_tgen_dut.u-chk_tgen |
| | 402 | 408 410 | 412 | 414 | 416 | 418 | 420 | combined = sim || formal

IF (formal_fail || sim_fail) → FAIL
ELSE IF ((formal_proven&&formal_covered) || sim_pass) → PASS
ELSE other

| Assertions Name | Average grade | | | Status grade | | | Enclosing Entity |
|---|---|---|---|---|---|---|---|
| | combined<br>Assertion Comb. Avg. Grade | sim<br>Assertion Avg. Grade | formal<br>Assertion Formal Avg. Grade | combined<br>Combined Status Grade | sim<br>Assertion Status Grade | formal<br>Assertion Formal Status Grade | |
| cov_synched_rd_pulse | 100% | 100% | 100% | N/A | N/A | N/A | top_tgen_pvmem.u_tgen_dut.u-chk_tgen |
| cov_tgen_busy_pulse | 100% | 100% | 100% | N/A | N/A | N/A | top_tgen_pvmem.u_tgen_dut.u-chk_tgen |
| cov_PREADY_pulse | 100% | 100% | 100% | N/A | N/A | N/A | top_tgen_pvmem.u_tgen_dut.u-chk_tgen |
| a_rd_data_cfg_reload_value_dup | 100% | 0% | 100% | 100% | 0% | 100% | top_tgen_pvmem.u_tgen_dut.u-chk_tgen |
| a_rd_data_cfg_reload_value | 100% | 0% | 100% | 100% | 0% | 100% | top_tgen_pvmem.u_tgen_dut.u-chk_tgen |
| a_wr_data_cfg_reload_value_dup | 100% | 0% | 100% | 100% | 0% | 100% | top_tgen_pvmem.u_tgen_dut.u-chk_tgen |
| a_wr_data_cfg_reload_value | 100% | 0% | 100% | 100% | 0% | 100% | top_tgen_pvmem.u_tgen_dut.u-chk_tgen |
| a_id_mismatch_err_set_whthin_window | 100% | 100% | 100% | 0% | 0% | 0% | top_tgen_pvmem.u_tgen_dut.u-chk_tgen |
| a_data_error_set_within_window | 100% | 100% | 100% | 0% | 0% | 0% | top_tgen_pvmem.u_tgen_dut.u-chk_tgen |
| a_pulse_wid_chk_wr_data_fifo | 100% | 0% | 100% | 0% | 100% | 0% | top_tgen_pvmem.u_tgen_dut.u-chk_tgen |
| a_pulse_wid_chk_wr_addr_fifo | 100% | 0% | 100% | 0% | 100% | 0% | top_tgen_pvmem.u_tgen_dut.u-chk_tgen |
| a_pulse_wid_chk_rd_data_fifo | 100% | 100% | 100% | 0% | 100% | 0% | top_tgen_pvmem.u_tgen_dut.u-chk_tgen |
| a_pulse_wid_chk_rd_addr_fifo | 100% | 100% | 100% | 0% | 100% | 0% | top_tgen_pvmem.u_tgen_dut.u-chk_tgen |
| a_one_clk_pulse_load_split_wr | 100% | 100% | 100% | 100% | 100% | 0% | top_tgen_pvmem.u_tgen_dut.u-chk_tgen |
| a_one_clk_pulse_load_split_rd | 100% | 100% | 100% | 0% | 100% | 0% | top_tgen_pvmem.u_tgen_dut.u-chk_tgen |
| a_one_clk_pulse_synched_apb_wr | 100% | 100% | 0% | 0% | 100% | 0% | top_tgen_pvmem.u_tgen_dut.u-chk_tgen |
| a_one_clk_pulse_synched_apb_rd | 100% | 100% | 100% | 0% | 100% | 0% | top_tgen_pvmem.u_tgen_dut.u-chk_tgen |
| a_mutex_synched_apb_wr_rd | 100% | 100% | 100% | 0% | 100% | 0% | top_tgen_pvmem.u_tgen_dut.u-chk_tgen |
| a_tgen_busy_pulse_width | 100% | 100% | 100% | 0% | 100% | 0% | top_tgen_pvmem.u_tgen_dut.u-chk_tgen |
| a_one_clk_pulse_PREADY | 100% | 100% | 100% | 0% | 100% | 0% | top_tgen_pvmem.u_tgen_dut.u-chk_tgen |
| a_one_clk_later | 100% | 100% | 100% | 0% | 100% | 0% | top_tgen_pvmem.u_tgen_dut.u-chk_tgen | combined = sim || formal

IF (formal_fail || sim_fail) → FAIL
ELSE IF ((formal_proven&&formal_covered) || sim_pass) → PASS
ELSE other

METHOD AND SYSTEM FOR VERIFICATION USING COMBINED VERIFICATION DATA

FIELD OF THE INVENTION

The present invention relates to verification systems and methods. More specifically embodiments of the present invention relate to method and system for verification using combined verification data.

BACKGROUND OF THE INVENTION

Verification can be a tedious task that may occupy a considerable amount of time of programmers. Specifically, a lot of time may be invested in locating faults (typically referred to as "bugs") in the program. Automatic fault localization techniques were introduced that are aimed at addressing this problem. For example, automatic fault localization may involve the use of coverage information.

When testing a code, the extent to which that code was actually tested—typically referred to as "coverage"—may be measured.

Currently here can be various kinds of coverage metrics, like code coverage, functional coverage, etc. There can also be various verification engines with which coverage may be graded (e.g., simulation, emulation, formal).

It may be desired to consider a combined coverage grade, which is calculated by combining coverage grades obtained from several verification engines that apply different verification method (e.g., simulation, formal, etc.) into a single combined coverage grade for each coverage entity in a verification model.

SUMMARY OF THE INVENTION

There is thus provided, in accordance with some embodiments of the present invention, a method for combining verification data. The method includes, using a processor, obtaining verification data and a verification model from each of a plurality of verification engines relating to different verification methods, the verification data relating to a plurality of verification tests that were conducted on a design under test (DUT) using the plurality of verification engines. The method also includes, using a processor, merging the coverage models obtained from the plurality of verification engines into a merged coverage model. The method also includes, using a processor, calculating a combined coverage grade for each coverage entity of a plurality of coverage entities in the merged coverage model using coverage grades for that coverage entity calculated from the verification data obtained from the plurality of engines and applying a combined coverage grade rule; and outputting the combined coverage grade via an output device.

In some embodiments of the invention, the combined coverage grade rule is a predetermined default rule.

In some embodiments of the invention, the method further includes receiving from a user, via an input device, information relating to the combined coverage grade rule.

In some embodiments of the invention, the output device is a display device, and the method further includes presenting a coverage grade corresponding to each of the multiple verification engines for each of the coverage entities on the display device.

In some embodiments of the invention, the verification metric is coverage or status.

In some embodiments of the invention, the method further includes performing rolled-up calculation of coverage grades for coverage entities of the DUT that include coverage entities of said plurality of coverage entities.

In some embodiments of the invention, the combined coverage grade rule dictates that a coverage entity is considered covered if it was covered by one of the verification engines.

In some embodiments of the invention, the combined coverage grade rule dictates that that coverage entity is not considered covered if any of the plurality of verification engines returns an error for that coverage entity.

There is also provided, according to some embodiments of the present invention, a method for combining verification data that includes receiving from a user a verification plan which includes a plurality of verification sections of a verification model of a Design Under Test (DUT), each of the verification sections including one or a plurality of coverage entities, the verification plan further including different combined coverage grade rules, each of the combined coverage rules corresponding to one of the verification sections.

The method also includes obtaining verification data from a plurality of verification engines relating to the different verification methods, the verification data relating to a plurality of verification tests that were conducted on the DUT, using the plurality of verification engines.

The method also includes, for each section of the verification sections, calculating a combined coverage grade for each coverage entity of said one or a plurality of coverage entities in that section using coverage grades for that coverage entity calculated from the verification data obtained from the plurality of engines and applying the combined coverage grade rule corresponding to that section.

The method further includes outputting the combined coverage grade via an output device.

In some embodiments of the invention, the method also includes, using the processor, determining whether coverage targets were met.

There is also provided, according to some embodiments of the invention, a system for combining verification data. The system includes an output device; and a processor, configured to: obtain verification data and a coverage model from each of a plurality of verification engines relating to different verification methods, the verification data relating to a plurality of verification tests that were conducted on a design under test (DUT) using the plurality of verification engines; merge the coverage models obtained from the plurality of verification engines into a merged coverage model; calculate a combined coverage grade for each coverage entity of a plurality of coverage entities in the merged coverage model using coverage grades for that coverage entity calculated from the verification data obtained from the plurality of engines and applying a combined coverage grade rule; and output the combined coverage grade via the output device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 illustrates a graphical user interface view, listing verification entities (e.g., assertions) of a verification model and their coverage grades and status grades, according to some embodiments of the present invention.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as is apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Verification is a process of verifying that a circuit design conforms to the specification set by the designers of that circuit. Typically, verification processes include conducting numerous test runs on the design under test (DUT) in various verification environments (e.g., test benches in simulations and constraint sets in formal verification scenarios), which may actually verify different design integration levels (modules in a system).

A verification process aimed at verifying the design of a DUT typically involves collecting verification data that may include verification metrics, such as, for example, verification data relating to coverage (e.g., code coverage, functional coverage etc.) of coverage entities in the DUT and/or to status (e.g., failed or passed) or of assertions relating to code of the DUT.

When testing a design, measuring the extent of coverage of that design during execution runs may provide valuable information. A "design" may refer to an electronic design, which may be implemented in software (e.g., as a verification model) which is used in verification of that design, or in hardware.

Hereinafter some embodiments of the invention are described with reference to a DUT, by way of example, but it should be understood that some embodiments of the present invention may be implemented on any verification model (hereinafter—verification model) or models being tested.

There are various kinds of verification metrics, e.g., code coverage, that measures the percentage of code that was executed during execution runs, functional coverage, measuring the percentage of functionalities pertaining to that code that were executed during execution runs, status of assertions that are predicates relating to specific points in the code.

Code coverage is a metric that measures the extent at which the code lines were executed in the implementation of a design under test (DUT). There are a number of other metrics associated with code coverage that electronic design automation (EDA) tools can measure, such as, for example, whether each code line has toggled to their true or false states, etc.

Functional coverage is a metric that measures the coverage of functionalities of the DUT.

Status of an assertion is typically "pass" (or true), indicating that that assertion is correct or "fail" (or false) if the assertion is incorrect.

Typically a verification model has a hierarchical structure in the form of a tree, with coverage entities at its nodes. Some nodes have children nodes while other nodes have no children and are referred to as "leafs". At the basic level are basic verification entities (e.g., bin, statement, assertion, bucket, block, etc.), which may typically be graded "1" (e.g., if covered in a certain run) or "0" (e.g., if uncovered). The grades of higher hierarchies are typically calculated using a roll-up calculation, so that, for example, a block with a plurality of coverage entities of which only 70 percent were covered may receive a coverage grade of 70%, and this roll-up calculation may also be implemented with respect to higher hierarchies of the tree representing the DUT.

EDA tools (e.g., tools employing a hardware description language—HDL, such a, for example, Verilog) may be used to obtain, or generate, parts of or a complete verification model of a DUT. In some embodiments of the invention parts of or complete verification model of the DUT may be, alternatively or additionally, provided, for example, by a user (e.g., a verification tester, debugging expert, another user etc.—hereinafter generally referred to as a "user"). A functional verification model, or functional coverage entities of a code verification model, may typically be provided by a user.

Verification metrics measurements on a design project may be made using a variety of verification engines, for example, simulation, emulation, and formal verification. An entire DUT, or different portions or aspects of a DUT may each be verified using separate verification engines. For example, feature "A" in a design may be verified using a dynamic verification engine, while feature "B" may be verified using a formal verification engine, and a feature "C" may be verified using both verification engines.

Simulation and emulation typically involve subjecting the DUT to a series of tests (e.g., by running a test regression, that includes a very large number of different tests) being carried out on the respective verification model. Formal coverage takes a different approach, in which, rather than subject the verification model to a series of test executions (hereinafter also referred to as "tests") of the DUT are formally analyzed to determine the coverage.

Completeness of the verification effort is often measured using coverage data. A coverage grade that lets a user have both set sign-off status, and indicate toward areas that still require more verification effort.

While coverage data may be readily available from each of these verification engines, and a grading scheme may be well established with respect to each of these verification engines, thus far a combined grading system which reflects a combined coverage contribution from all engines may have not been considered.

In some cases combining coverage information may not pose a big challenge. For example, simulation coverage and emulation coverage are typically very similar in nature (both are considered as dynamic coverage methods) and thus coverage data from both of these coverage metrics methods may be easily combined.

It may be more challenging trying to combine static coverage data (e.g. resulting from formal coverage) with coverage data from the dynamic engines (simulation and/or emulation), which is not so straight forward due to the difference in nature between the coverage engines used.

For example, a simulation verification engine may determine that a certain coverage entity of a DUT model code was covered, while a formal verification engine may determine that it was not covered. The verification expert may find this information difficult to comprehend and to address. In another example, a simulation verification engine may determine that the coverage grade of a certain block (featuring a plurality of coverage entities) of a DUT model is 60 percent, while a formal verification engine may determine that the coverage grade for that block is only 40 percent. This clearly may be confusing.

Some embodiments of the present invention may provide a method and system for determining a combined verification metric grade for a verification model, based on verification data relating to that metric (e.g., coverage, status, etc.) that is provided by a plurality of verification engines each employing a unique verification method on a DUT.

According to some embodiments of the invention, a verification tool may be designed to facilitate merging verification metric data from different verification engines, and generating a verification model and further obtain a combined verification metric grade, according to a combined verification metric grade rule. In some embodiments, the combined verification metric grade rule may be a default rule, that is a-priori provided in the verification tool. In some embodiments a user may be allowed to customize the combined verification metric grade rule or to provide a user-defined combined verification metric grade rule, to suit specific demands and needs of the user.

Figure 1:
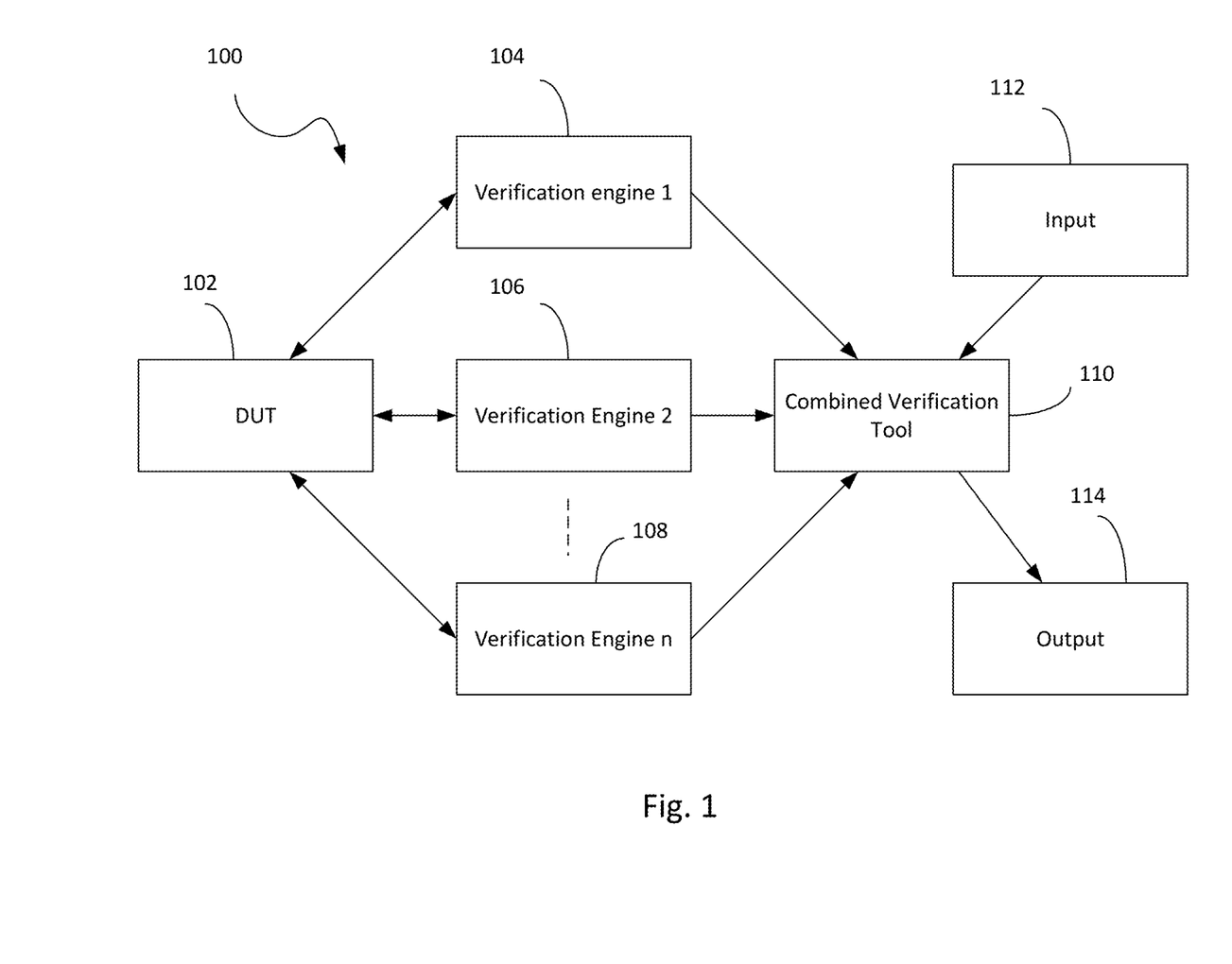
FIG. 1 is a diagram showing a schematic flow of merging coverage data from a plurality of verification engines and obtaining combined verification metric grade, according to some embodiments of the present invention.

FIG. 1 is a diagram that illustrates a schematic flow 100 of merging verification metric data from a plurality of verification engines and obtaining a combined metric grade, according to some embodiments of the present invention.

A design to be tested (DUT 102) may be subjected to verification testing by a plurality of verification engines (e.g., verification engine 1, 104, verification engine 2, 106, up to verification engine n, 108). The verification engines may be designed to perform verification processes relating to different verification methods, for example, simulation, verification, and formal verification—each verification engine dedicated to a unique verification method.

Verification metric data generated by each of the verification engines, and relating to one or more verification metrics, may be generated and provided to a combined verification tool 110 that merges the verification metric data from all of the verification engines, and calculates a combined verification metric grade. The merging of verification metric data from verification engines of different types and the identifying of verification metric data that relates to corresponding instances in different verification models (e.g., of the same design) can be done as described, for example, in U.S. Pat. No. 8,413,088, which is incorporated herein in its entirety by way of reference.

A user may input information (e.g., data and/or commands) via input device 112, and the combined verification tool may output data (e.g., data and/or commands), for example in the form of a user interface, via output device 114 (e.g., display device, printer, etc.).

Figure 2:
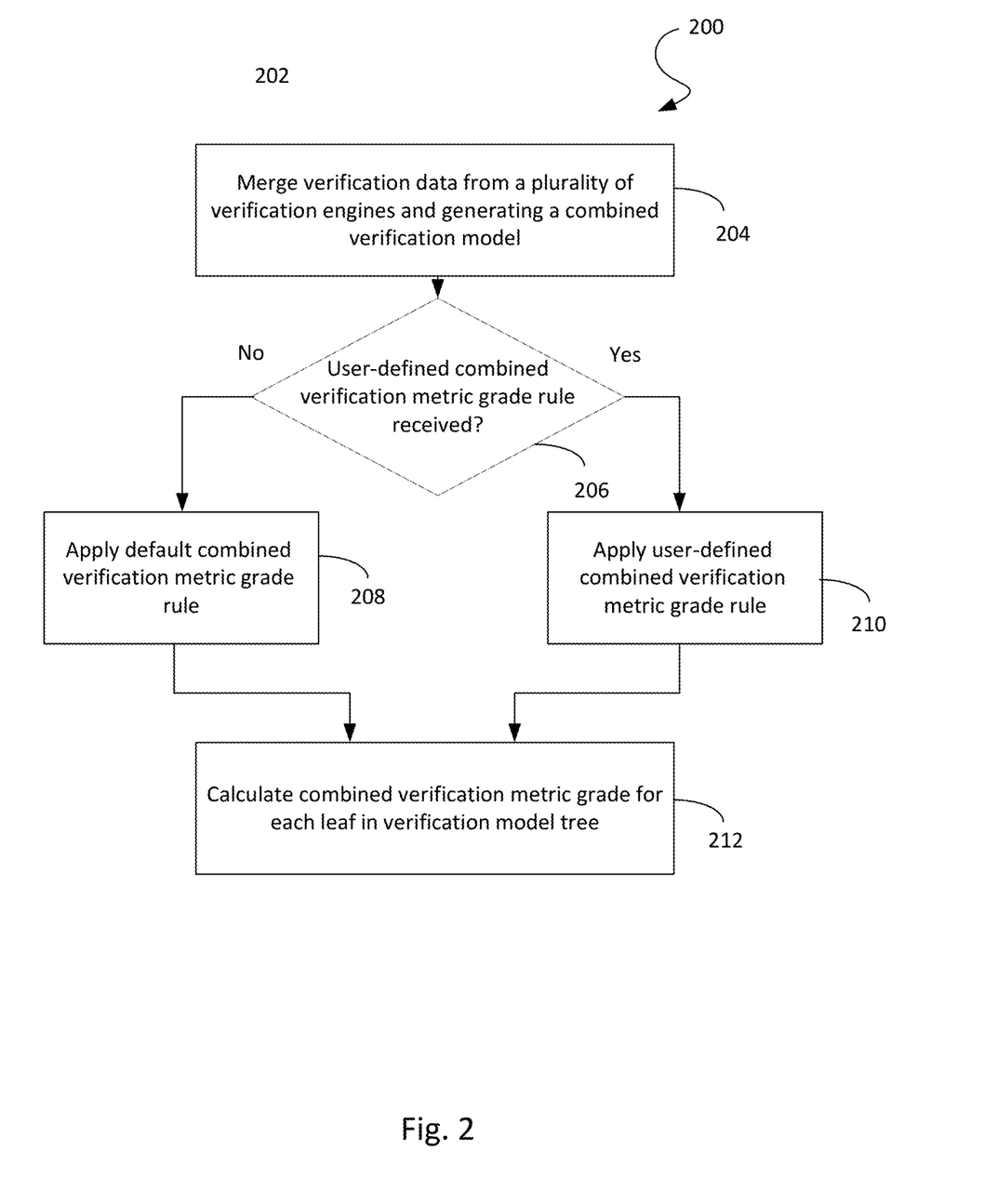
FIG. 2 is a flow chart illustrating a method for calculating a combined verification metric grade for an entity of a verification model, according to some embodiments of the present invention.

FIG. 2 is a flow chart illustrating a method 200 for calculating a combined verification metric grade for an entity in a verification model, according to some embodiments of the present invention.

According to some embodiments of the present invention, such method includes merging 204 verification data and a verification model from a plurality of verification engines, each of the verification engines dedicated to a unique verification method, into a combined verification model and identifying corresponding instances of verification entities in different verification models (each relating to a unique verification engine of the plurality of verification engines) in the generated combined verification model of the DUT. The method may include determining 206 whether a user-defined combined coverage grade rule had been received. If no user-defined combined coverage grade rule was received then a default rule may be applied 208 to calculate 212 a combined coverage grade for each corresponding coverage entity (e.g., each instance of such entity) in the different verification models.

Hereinafter, coverage grades are considered, as an example for verification metric, however it is noted that some embodiments of the present invention may relate to other types of verification metrics, such as, for example, status (e.g., of assertions).

Typically, for each test run, each of the verification engines determines whether any of the instances of coverage entities in the verification model tested was covered. Typically, a coverage grade is determined for each leaf in a verification model tree. For example, the coverage grade may be, for a certain run, "1" if that instance was covered in that specific run, or "0" if it was not covered in that run. In the combined verification model, for example, a default combined coverage grade rule, according to some embodiments of the present invention, may dictate that if verification data from one or more of the verification engines indicates that that instance was covered in a test run, then the combined coverage grade for that instance in that test run is "1", whereas it is "0" only if none of the verification engines has indicated that the instance was covered.

A user may provide a user-defined combined coverage grade rule which, may be used to calculate a combined coverage grade for each instance of a coverage entity in the coverage model (verification model relating to coverage). For example, the user may input a combined coverage grade rule that requires more than one hit to be identified (e.g., at least two verification engines indicating that the corresponding instance of a coverage entity was covered) to grade that instance as "1". In other embodiments, the user may input a combined coverage grade rule that requires all verification engines to indicate that the corresponding instance of a coverage entity was covered to grade it as "1" in order to score "1".

Figure 3A:
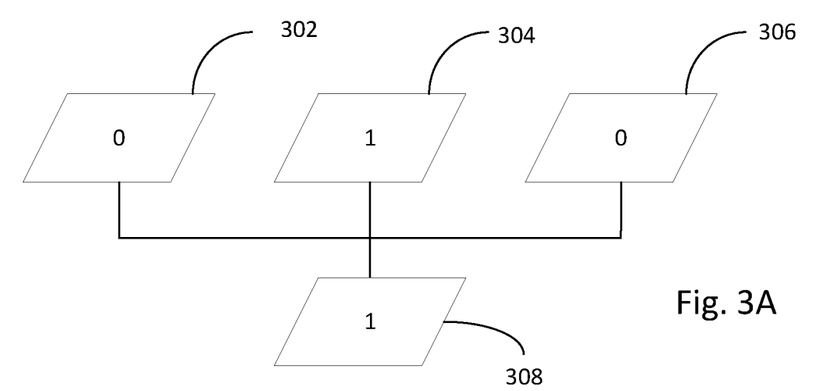
FIG. 3A is a diagram that illustrates a combined coverage grade rule for calculating a combined coverage grade, according to some embodiments of the present invention.

FIG. 3A is a diagram that illustrates a combined coverage grade rule for calculating a combined coverage grade, according to some embodiments of the present invention. For example, a plurality of verification engines may submit verification data that may be merged to generate a merged coverage model of the DUT, so as to allow calculating a combined coverage grade for a specific instance of a coverage entity in the merged coverage model. In this example the combined coverage grade rule dictates that even if one (or more) of the verification engines indicates that this instance had been covered (grade "1", 304, whereas the other verification engines returned "0", 302, and 306) the combined coverage grade would be "1", 308. In some embodiments of the invention, the combined coverage grade is "1" given the above condition, only if no error was returned from any of the other verification engines.

Figure 3B:
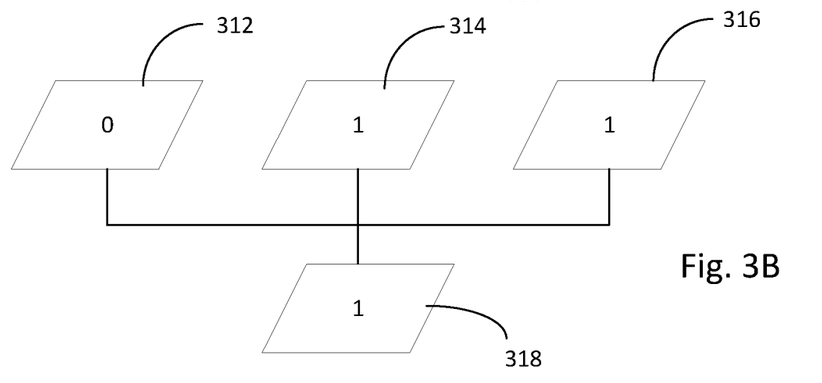
FIG. 3B is a diagram that illustrates another combined coverage grade rule for calculating a combined coverage grade, according to some embodiments of the present invention.

FIG. 3B illustrates another combined coverage grade rule for calculating a combined coverage grade, according to some embodiments of the present invention. In this embodiment the combined coverage grade rule dictates that at least two of the verification engines ought to indicate that this instance had been covered (grade "1", 314, 316, whereas a third verification engine returned "0", 312) for the combined coverage grade to be "1", 318.

Figure 3C:
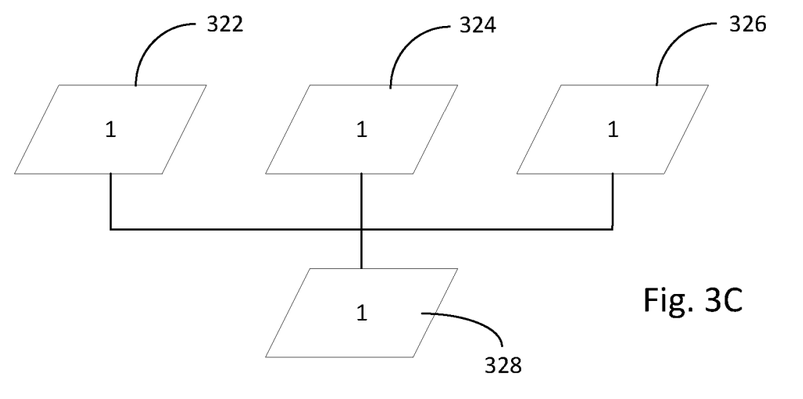
FIG. 3C is a diagram that illustrates yet another combined coverage grade rule for calculating a combined coverage grade, according to some embodiments of the present invention.

FIG. 3C illustrates yet another combined coverage grade rule, according to some embodiments of the present invention. In this example the combined coverage grade dictates that all of the verification engines ought to indicate that this instance had been covered (grade "1", 322, 324, and 326) for the combined coverage grade to be "1", 328.

In some embodiments of the invention the calculated combined coverage grade for each instance is caused to be displayed on a display device, e.g. on a graphical user interface (GUI), or other user interface, next to the corresponding instance in a presentation of the verification model.

FIG. 4 illustrates a graphical user interface view 400, listing coverage entities of a verification model and their coverage grades (e.g., average coverage grade that takes into account coverage grades for all nodes in the tree, in the process of roll-up calculation) and status grades, according to some embodiments of the present invention.

View 400 may include a listing of verification entities, in this example—assertions 402, which are part of a verification model. A verification tool may be configured to generate such a view that includes coverage grades and status grades for each assertion. Typically, status grade a metric that may be used for example, for measuring failure/non-failure (e.g., true/false) of an assertion.

View 400 may include coverage grades, derived from verification data that is provided from each of the verification engines, e.g., simulation coverage grades (column 410), formal coverage grades (column 412), and combined coverage grades (column 408), that may be calculated using a combined coverage grade rule, according to some embodiments of the present invention. View 400 may also include status grades of assertions 402, that may be derived from the verification data that is provided by the different verification engines, e.g., simulation status grades (column 416), formal status grades (column 418) and combined status grades (column 414), that may be calculated using a combined status grade rule, according to some embodiments of the invention.

Column 420 may indicate, for each coverage entity, its enclosed entity within the verification model (e.g., a module, an instance, etc.).

By way of example, In some embodiments of the present invention, a default combined coverage grade rule for calculating a combined coverage grade (CCG) for a coverage entity, may be:

$$CCG = CG_{VE1} \lor CG_{VE2} \lor CG_{VE3} \ldots \lor CG_{VEn} \qquad \text{EQN1}$$

wherein CCG is the combined coverage grade, and $CG_{VEn}$, is the coverage grade derived from verification engine n (for n verification engines of different types).

In some embodiments of the invention, a default combined grade rule for calculating a combined status grade (CSG) for a verification entity (e.g., assertion), may be:
CSG=
   if $(SG_{VE1}=\text{fail} \lor SG_{VE2}=\text{fail} \ldots \lor SG_{VEn}=\text{fail})$
    →fail
   else
   if $(SG_{VE1}=\text{proven} \lor SG_{VE2}=\text{pass} \ldots$
    $\lor SG_{VEn}=\text{proven})$→pass
   else
    other These formulas (and/or others) may be used to calculate the combined coverage grade and the combined status grade for each coverage entity at the leaf level of the tree representing the combined verification model (the basic hierarchy level in that tree).

In some embodiments of the invention, a user may input user-defined formulations of the calculation of combined coverage grade and combined status grade.

Figure 5:
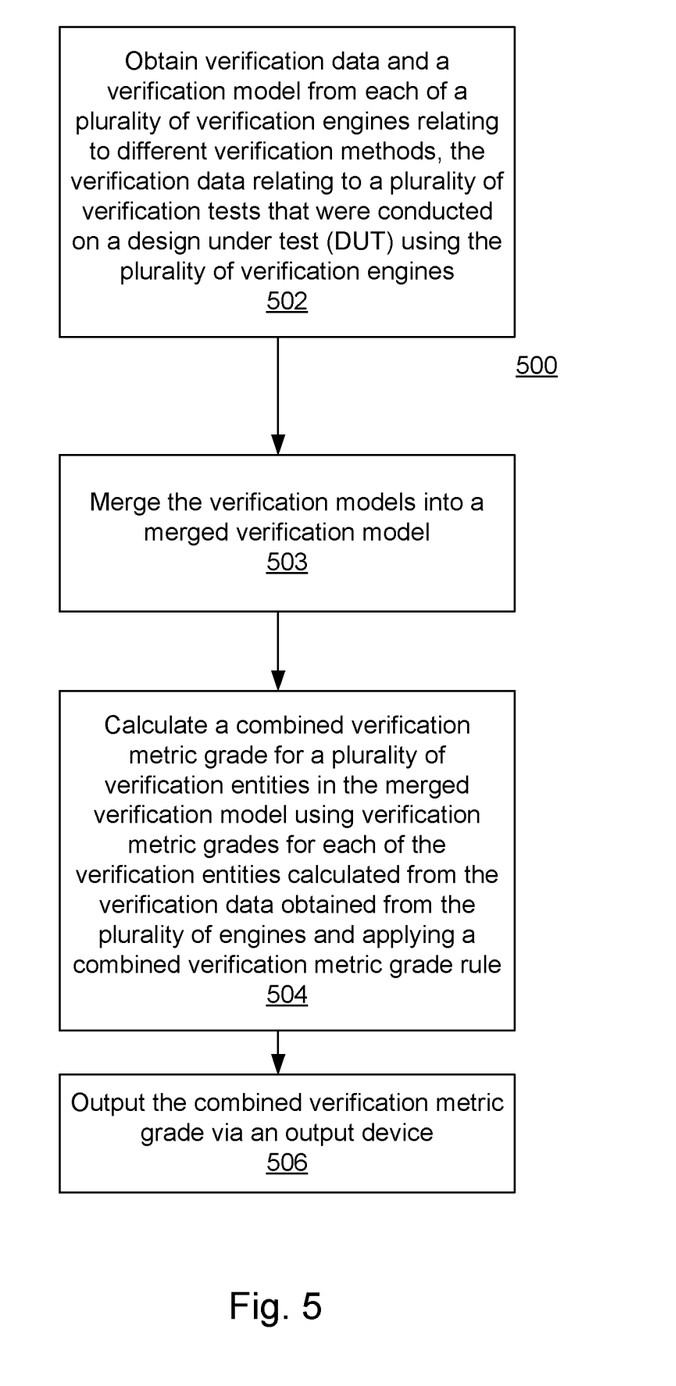
FIG. 5 illustrates a method for combining verification data, that includes obtaining a combined verification metric grade according to some embodiments of the present invention.

FIG. 5 illustrates a method for combining verification data, that includes obtaining a combined verification metric grade, according to some embodiments of the present invention.

Method 500 may include using a processor, obtaining 502 verification data and a verification model from each of a plurality of verification engines relating to different verification methods, the verification data relating to a plurality of verification tests that were conducted on a design under test (DUT) using the plurality of verification engines.

Method 500 may also include using a processor, merging 503 the verification models obtained from the plurality of verification engines into a merged verification model.

Method 500 may also include using a processor, calculating 504 a combined verification metric grade for a plurality of verification entities in the merged verification model, e.g., leaves in a tree representation of the merged verification model using verification metric grades for each of the plurality of verification entities calculated from the verification data obtained from the plurality of engines and applying a combined verification metric grade rule; and outputting 506 the combined verification metric grade via an output device.

In some embodiments of the invention, the combined verification metric grade rule is a predetermined default rule. For example, one or a plurality of predetermined combined verification metric grade rules may be included as part of the verification tool.

In some embodiments of the invention, the combined verification metric grade rule may be received from a user, via an input device. For example, the user may input a combined verification metric grade rule, parameters that relate to such rule via an input device, or any other information relating to the combined verification metric grade rule.

In some embodiments of the invention, the output device is a display device, and the method includes presenting a verification metric grade corresponding to each of the multiple verification engines for each of the verification entities on the display device.

In some embodiments of the invention, the combined verification metric grade rule is a combined coverage grade rule that dictates that a verification entity is considered covered if it was covered by one of the verification engines.

In some embodiments of the invention, the combined coverage grade rule dictates that that coverage entity is not considered covered if any of the plurality of verification engines returns an error for that coverage entity.

In some embodiments the method includes performing rolled-up calculation of combined verification metric grades for other verification entities of merged verification model.

There are various known roll-up calculations that may be applied in connection with embodiments of the present invention, such as, for example, average grade roll-up, that calculates coverage grades for each node in the verification model, covered grade roll-up, that calculates coverage grades for just the leafs in the verification model, etc.

In some embodiments of the invention, a user may provide a verification plan (e.g., in a Vplan file), which addresses various parts of the verification model differently when calculating a combined coverage grade. A verification plan may include sections that include one or a plurality of coverage entities. The user may assign, in the verification plan, different combined coverage grade rules to different sections, thereby addressing differently coverage for each section of the verification model.

For example, for a specific coverage section, the user may dictate, that the coverage entities in that section would be considered verified if covered by the simulation engine (regardless of the coverage grade obtained from other verification engines). In another example, for a specific coverage section, the user may dictate, that the coverage entities in that section would be considered verified if covered by the simulation engine (regardless of the coverage grade obtained from other verification engines), unless another verification engine returns an error, in which case it would not be regarded as verified.

A user may provide a verification plan, e.g., via input device 112, FIG. 1. Combined verification tool 110 may obtain the verification data from the plurality of verification engines 104, 106, 108, calculate combined coverage grades, as dictated by the combined coverage grade rules for each section of the verification model.

Figure 6:
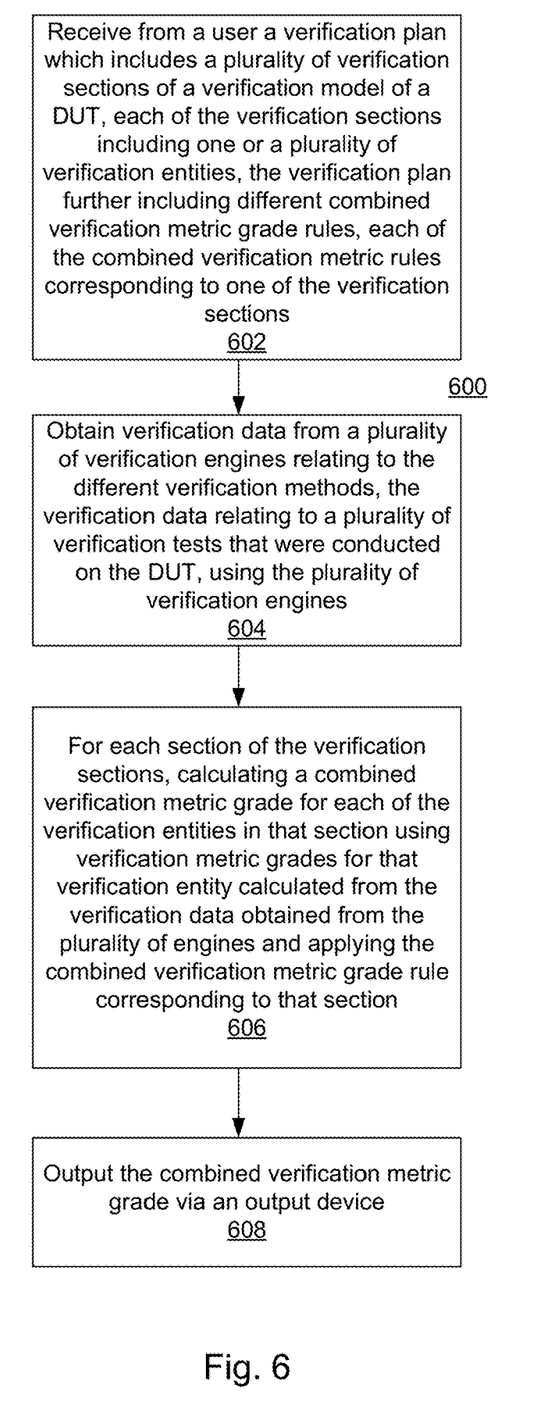
FIG. 6 illustrates a method for verification using verification plan according to some embodiments of the invention.

FIG. 6 illustrates a method 600 of verification using a verification plan according to some embodiments of the invention.

Method 600 includes receiving 602 from a user a verification plan which includes a plurality of verification sections of a verification model of a Design Under Test (DUT), each of the verification sections including one or a plurality of verification entities, the verification plan further including different combined verification metric grade rules, each of the combined verification metric rules corresponding to one of the verification sections.

Method 600 also includes obtaining 604 verification data from a plurality of verification engines relating to the different verification methods, the verification data relating to a plurality of verification tests that were conducted on the DUT, using the plurality of verification engines.

Method 600 further includes, for each section of the verification sections, calculating 606 a combined verification metric grade for each of the plurality of verification entities in that section using verification metric grades for that verification entity derived from the verification data of the plurality of verification engines and applying the combined verification metric grade rule corresponding to that section.

Method 600 may also include outputting 608 the combined coverage grade via an output device.

In some embodiments of the invention, the output device is a display device, the method further comprising presenting the combined coverage grade in on a user interface for display on the display device. In some embodiments of the invention, the method may include performing a roll-up calculation of combined verification grades for other verification entities in each section may be performed.

Such roll-up calculations may include roll-up calculation of average coverage grade, and roll-up calculation of covered coverage grade.

A verification process typically involves using verification engines of different kinds—relating to different verification methods, for determining verification coverage over the DUT coverage model or a verification plan (e.g., vPlan). Some embodiments of the present invention offer an effective tool to combine coverage data collected from different verification engines (relating to different verification methods), allowing obtaining coverage results from different engines and better understanding of these results. This may lead to shortened and more efficient verification process, which enhances the entire verification process. In the past verification progress (coverage) was calculated only separately from each verification engine, which may have led to either duplicated verification work (e.g., one block verified using formal verification engine, whereas still striving to get 100% coverage using simulation engine), or to insufficient verification, where verifying coverage using one verification engine may not be enough, as it is still required to verify coverage by another verification engine (employing different verification method).

According to some embodiments of the invention an automated verification process is provided, that may shorten the verification process without hindering the quality of the process.

Some embodiments of the invention further provide for planning upfront targeted coverage for each verification tool, offering coherent, and easy to track sign-off criteria enabling better prediction and tracking of a project timeline.

Figure 7:
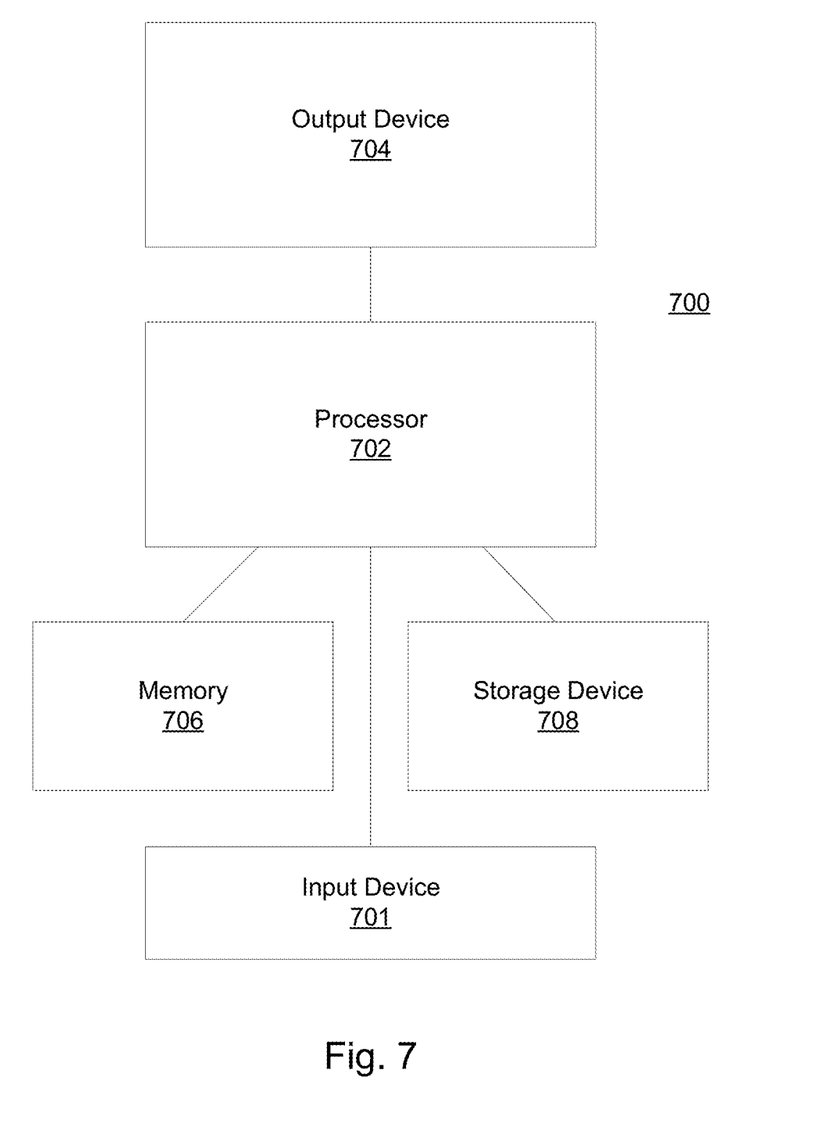
FIG. 7 illustrates a system for verification using combined verification data, according to some embodiments of the invention.

FIG. 7 illustrates a system for verification using combined verification data, according to some embodiments of the invention.

System 700 may include a processor 702 (e.g. one or a plurality of processors, on a single machine or distributed on a plurality of machines) for executing a method according to some embodiments of the present invention. Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g. display device such as CRT, LCD, LED etc.) on which one or a plurality user interfaces associated with a program implementing a method according to some embodiments and corresponding data may be presented. System 700 may also include input device 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and be executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for combining verification data comprising:
using a processor, obtaining verification data and a verification model from each of a plurality of verification engines relating to different verification methods, the verification data relating to a plurality of verification tests that were conducted on a design under test (DUT) using the plurality of verification engines;
using a processor, obtaining a user-defined combined verification metric grade rule;
using a processor, merging the verification models obtained from the plurality of verification engines into a merged verification model;
using a processor, calculating a combined verification metric grade for a plurality of verification entities in the merged verification model, by applying the combined verification metric grade rule to verification metric grades for each of the plurality of verification entities calculated from the verification data obtained from the plurality of engines; and
outputting the combined verification metric grade via an output device.

2. The method of claim 1, wherein the output device is a display device, the method further comprising presenting a verification metric grade corresponding to each of the multiple verification engines for each of the verification entities on the display device.

3. The method of claim 1, wherein the verification metric is coverage or status.

4. The method of claim 3, wherein the combined verification metric grade rule is a combined coverage grade rule that dictates that a coverage entity is considered covered if it was covered by one of the verification engines.

5. The method of claim 4, wherein the combined coverage grade rule dictates that the coverage entity is not considered covered if any of the plurality of verification engines returns an error for that coverage entity.

6. The method of claim 1, further comprising performing a roll-up calculation of combined verification metric grades for other verification entities of the merged verification model.

7. A method for combining verification data comprising:
receiving from a user a verification plan which includes a plurality of verification sections of a verification model of a Design Under Test (DUT), each of the verification sections including one or a plurality of verification entities, the verification plan further including different combined verification metric grade rules, each of the combined verification metric rules corresponding to one of the verification sections;
obtaining verification data from a plurality of verification engines relating to the different verification methods, the verification data relating to a plurality of verification tests that were conducted on the DUT, using the plurality of verification engines;
for each section of the verification sections, calculating a combined verification metric grade for each of the verification entities in that section by applying the combined verification metric grade rule corresponding to that section to verification metric grades for that verification entity derived from the verification data of the plurality of engines; and
outputting the combined verification metric grade via an output device.

8. The method of claim 7, wherein the verification metric is coverage or status.

9. The method of claim 7, wherein the output device is a display device, the method further comprising presenting the combined verification metric grade in a user interface for display on the display device.

10. The method of claim 7, further comprising performing a roll-up calculation of verification metric grade for each of the verification sections for other verification entities.

11. A system for combining verification data, the system comprising:
an output device; and
a processor, configured to:
obtain verification data and a verification model from each of a plurality of verification engines relating to different verification methods, the verification data relating to a plurality of verification tests that were conducted on a design under test (DUT) using the plurality of verification engines;

obtain a user-defined combined verification metric grade rule;

merge the verification models obtained from the plurality of verification engines into a merged verification model;

calculate a combined verification metric grade for a plurality of verification entities in the merged verification model, by applying the combined verification metric grade rule to verification metric grades for each of the plurality of verification entities calculated from the verification data obtained from the plurality of engines; and output the combined verification metric grade via the output device.

12. The system of claim 11, wherein the verification metric is coverage or status.

13. The system of claim 11, wherein the output device is a display device, and wherein the processor is configured to present the verification metric grade on the display device.

14. The system of claim 11, wherein the processor is configured to perform a roll-up calculation of combined verification metric grades for other verification entities of the merged verification model.

15. The system of claim 11, wherein the combined verification metric grade rule is a combined coverage grade rule that dictates that a coverage entity is considered covered if it was covered by one of the verification engines.

16. The system of claim 15, wherein the combined coverage grade rule dictates that the coverage entity is not considered covered if any of the plurality of verification engines returns an error for that coverage entity.

* * * * *